United States Patent
Jeske

(10) Patent No.: US 7,728,468 B2
(45) Date of Patent: Jun. 1, 2010

(54) LAMINATIONS WITH INTEGRATED SPACING FEATURE FOR AN ELECTRIC MACHINE, AND METHOD OF MAKING A LAMINATION

(75) Inventor: Rainer Jeske, Höchstadt/A. (DE)

(73) Assignee: Siemens Aktiengesellschaft, Munich (DE)

(*) Notice: Subject to any disclaimer, the term of this patent is extended or adjusted under 35 U.S.C. 154(b) by 305 days.

(21) Appl. No.: 11/556,862

(22) Filed: Nov. 6, 2006

(65) Prior Publication Data

US 2007/0085440 A1    Apr. 19, 2007

Related U.S. Application Data

(63) Continuation-in-part of application No. PCT/DE2004/002405, filed on Oct. 28, 2004.

(51) Int. Cl.
*H02K 1/32* (2006.01)
(52) U.S. Cl. .............. 310/59; 310/21.044; 310/216.048
(58) Field of Classification Search .................. 310/65, 310/216, 216.044, 216.048, 216.061, 216.014, 310/59; *H02K 1/20, 1/32*
See application file for complete search history.

(56) References Cited

U.S. PATENT DOCUMENTS

| | | | | |
|---|---|---|---|---|
| 595,364 | A * | 12/1897 | Batchelder ................. | 310/65 |
| 649,574 | A * | 5/1900 | Foshag ...................... | 310/65 |
| 662,010 | A * | 11/1900 | Mix et al. .................. | 310/65 |
| 662,928 | A * | 12/1900 | Geisenhoner ............... | 310/65 |
| 854,760 | A * | 5/1907 | Reist ....................... | 310/211 |
| 891,906 | A * | 6/1908 | Card ........................ | 310/65 |
| 905,805 | A * | 12/1908 | Porster ..................... | 310/216 |
| 1,083,822 | A * | 1/1914 | Geisenhoner ............... | 310/65 |
| 1,221,013 | A * | 4/1917 | Auel ........................ | 310/65 |
| 3,828,211 | A * | 8/1974 | Laronze .................... | 310/13 |
| 3,981,381 | A | 9/1976 | Nosek | |
| 4,335,324 | A * | 6/1982 | Fujioka et al. .............. | 310/61 |
| 4,542,313 | A * | 9/1985 | Di Pietro .................. | 310/65 |
| 4,647,435 | A | 3/1987 | Nonnenmann | |
| 5,094,074 | A | 3/1992 | Nishizawa et al. | |
| 5,349,741 | A * | 9/1994 | Neuenschwander ......... | 29/598 |
| 5,814,910 | A * | 9/1998 | Pelletier ................... | 310/65 |
| 5,826,323 | A * | 10/1998 | Walters .................... | 29/593 |
| 5,869,912 | A * | 2/1999 | Andrew et al. ............. | 310/52 |
| 5,894,182 | A * | 4/1999 | Saban et al. ............... | 310/217 |

(Continued)

FOREIGN PATENT DOCUMENTS

EP    0 743 430 A    11/1996

(Continued)

OTHER PUBLICATIONS

Kawakami, Iron Core for Dynamo-Electric Machine, Sep. 30, 1983, All pages (english translation of JP 58-165640).*

*Primary Examiner*—Quyen Leung
*Assistant Examiner*—Naishadh N Desai
(74) *Attorney, Agent, or Firm*—Henry M. Feiereisen; Ursula B. Day

(57) ABSTRACT

A lamination has at least one spacing strip which is formed by cutting out sheet-metal pieces from a metal sheet in order to define an inner boundary and an outer boundary of the lamination. A cut line is made in the metal sheet to define a contour for a spacing strip which is bent out of the main plane of the lamination.

10 Claims, 3 Drawing Sheets

U.S. PATENT DOCUMENTS

| | | | |
|---|---|---|---|
| 6,223,417 B1 * | 5/2001 | Saban et al. | 29/598 |
| 6,465,917 B2 * | 10/2002 | Wetzel et al. | 310/61 |
| 6,498,408 B2 * | 12/2002 | Tong et al. | 310/65 |
| 6,504,274 B2 * | 1/2003 | Bunker et al. | 310/64 |
| 6,617,749 B2 * | 9/2003 | Salamah et al. | 310/270 |
| 6,777,836 B2 * | 8/2004 | Tong et al. | 310/65 |
| 7,342,345 B2 * | 3/2008 | Salamah et al. | 310/270 |
| 2002/0047463 A1 * | 4/2002 | Neuenschwander | 310/216 |

FOREIGN PATENT DOCUMENTS

| | | | |
|---|---|---|---|
| JP | 58165640 A | * | 9/1983 |

* cited by examiner

LAMINATIONS WITH INTEGRATED SPACING FEATURE FOR AN ELECTRIC MACHINE, AND METHOD OF MAKING A LAMINATION

CROSS-REFERENCES TO RELATED APPLICATIONS

This application is a continuation-in-part of prior filed copending PCT International application no. PCT/DE2004/002405, filed Oct. 28, 2004, which designated the United States and on which priority is claimed under 35 U.S.C. §120.

BACKGROUND OF THE INVENTION

The present invention relates, in general, to the field of electric machines, and more particularly to improvements in laminations for use in electric motors and/or other static or dynamic electric machines. The invention also relates to a method of making such laminations.

Nothing in the following discussion of the state of the art is to be construed as an admission of prior art.

In order to dissipate heat produced during operation of a motor, stacks of laminations, also called electrical steel sheets, are used, whereby laminations with spacing strips are arranged at defined intervals with respect to one another between laminations without spacing strips to thereby provide radial ventilation. The spacing strips are used to maintain a specific distance between a lamination with the spacing strips and a neighboring lamination. As a result, free spaces are created between the laminations to allow air to flow and thereby cool the motor.

Heretofore, a lamination with spacing strips has been manufactured by initially stamping the outer boundary and the inner boundary of the lamination out of a metal sheet, or burning out the outer boundary and the inner boundary by means of a focused laser beam. Then, the spacing strips, which have previously been stamped out of a metal sheet in a separate process, are fitted at right angles on the lamination, using spot-welding. This manufacturing process is relatively time-consuming and cost-intensive. Furthermore, welding of spacing strips to a lamination often leads to inadequate attachment of the spacing strips so that the lamination is less capable of resisting the pressure exerted on it. In other words, if the pressure is too high, the spacing strips will break off the lamination.

It would therefore be desirable and advantageous to provide an improved lamination which obviated prior art shortcomings and which is easy and relatively inexpensive to manufacture.

SUMMARY OF THE INVENTION

According to one aspect of the present invention, a method of making a lamination, includes the steps of cutting out sheet-metal pieces from a metal sheet to define an inner boundary and an outer boundary, producing at least one cut line in the metal sheet to define a contour of a spacing strip, and bending the spacing strip out of a main plane of the metal sheet.

The present invention resolves prior art problems by the formation of a spacing strip which has been cut out from a metal sheet and suitably bent out of the main plane of the metal sheet. The cut line cuts hereby completely through the metal sheet. The method according to the present invention renders the manufacturing of laminations with spacing strips simpler and cheaper. The need for different types of operations such as stamping and welding, which are relatively time-consuming, complicated and expensive, are thus eliminated. No welding is now required, saving not only time and costs but also makes it possible to produce laminations with spacing strips that are able to withstand pressure exerted on them.

According to another feature of the present invention, the at least one cut line may be formed in the metal sheet in such a manner that the spacing strip remains connected to the metal sheet along a bending line and has a contact line which is opposite the bending line and is longer than the bending line. In this way, an increased contact area can be realized, to which the contact lines of the individual spacing strips of a lamination are added. This ensures coverage of the entire area of a neighboring lamination, thereby maintaining the distance between the lamination with spacing strips and the neighboring lamination.

According to another feature of the present invention, a plurality of cut lines may be formed in the metal sheet to define contours of a plurality of spacing strip, such that contact lines of neighboring spacing strips are bent out in different directions with respect to bending lines of the neighboring spacing strips. As a consequence, the spacing strips of a lamination can be bent out of the main plane of the lamination alternately in a left-handed or right-handed rotation. In this way, stability is enhanced to resist the pressure acting on the spacing strips compared to a configuration in which the spacing strips are bent out in only one direction.

According to another aspect of the present invention, a lamination includes a metal sheet defining a main plane and formed with plural spacing strips projecting out from the main plane and having a first edge formed in one piece with the metal sheet and a second free edge in opposition to the first edge intended for touching an adjacent metal sheet of another lamination.

According to another feature of the present invention, each spacing strip may have a v-shaped configuration.

According to another feature of the present invention, the first and second edges may extend in parallel relationship, thereby defining a trapezoidal configuration.

According to another feature of the present invention, the second edge may have a length which is longer than a length of the first edge.

According to yet another aspect of the present invention, an electric machine includes a stator, and a rotor spaced from the stator to define an air gap therebetween, wherein the stator and the rotor have each a lamination core made of stacked laminations, wherein at least one of the laminations is a metal sheet defining a main plane and formed with plural spacing strips projecting out from the main plane and having a first edge formed in one piece with the metal sheet and a second free edge in opposition to the first edge intended for touching an adjacent one of the laminations.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
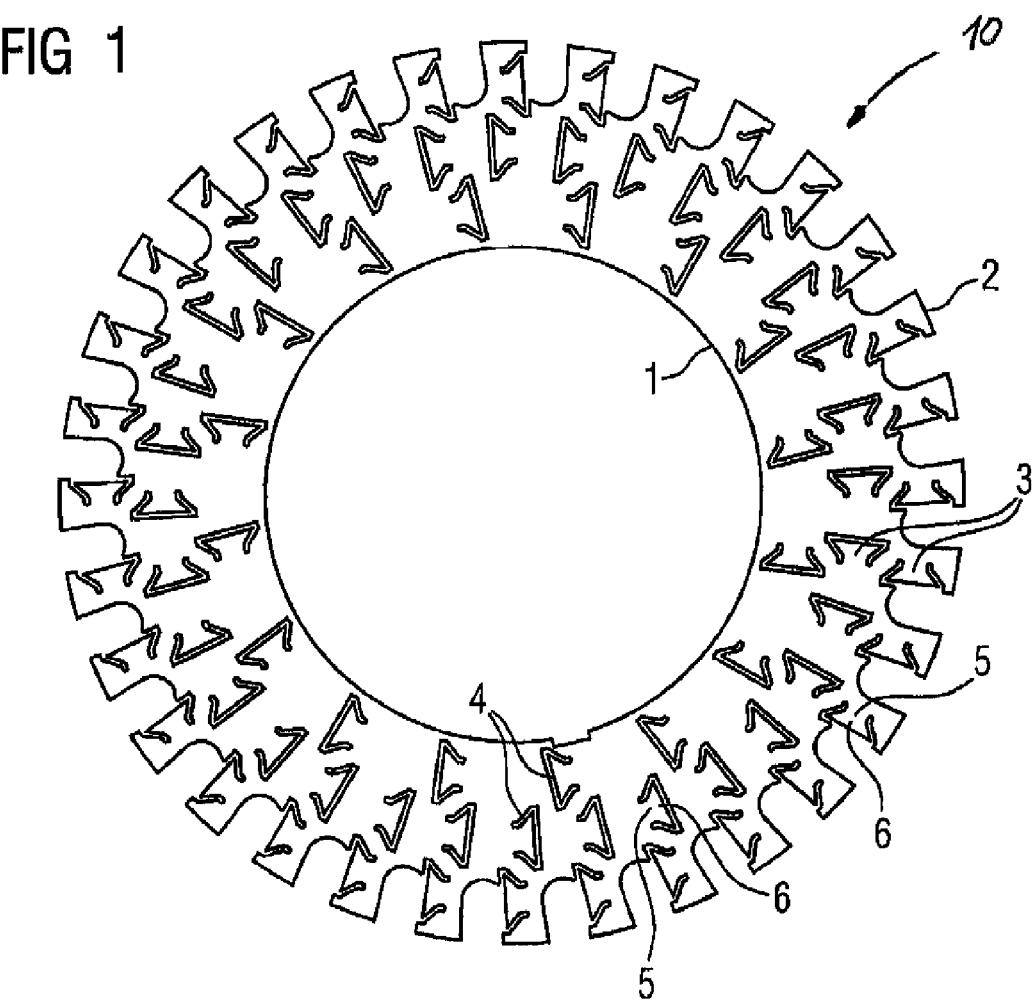
FIG. 1 is a schematic illustration of a lamination with spacing strips in accordance with the present invention.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a lamination in accordance with the present invention for use in the construction of a stator core and/or rotor core of an electric machine or other devices such as motors, generators, transformers and the like. In the following description, reference is made to a rotor core, as shown by way of example in FIG. 4. A lamination, generally designated by reference numeral 10 includes an inner boundary 1, an outer boundary 2 as well as cut lines 4 for formation of spacing strips 3. The boundaries 1 and 2 can be obtained from a metal sheet by burning them out using a focused laser beam. The laser burning method allows finer contours to be achieved. The cut line 4 for each spacing strip 3 can be obtained by stamping out, or likewise by means of the laser burning method. Stamping is a faster method than the laser method. In order to produce a lamination 10, a machine should therefore be used which has both a stamping and bending device and a laser burning device.

The cut lines 4 define the contours of the spacing strips 3. In this case, during the application of the cut lines 4, not only is the surface of the metal sheet scratched, but the cuts of the cut line 4 pass through the metal sheet. The cut lines 4 can also be produced by respectively stamping a narrow sheet-metal strip out, as indicated in FIG. 1.

The cut lines 4 may be formed either before or after the formation of the inner and outer boundaries 1, 2. Of course, it is certainly conceivable to make the inner and the outer boundaries 1 and 2 at the same time as the cut lines 4 for the spacing strips 3.

The cut lines 4 for the spacing strips 3 are applied to the metal sheet such that the spacing strips 3 are still connected to the lamination 10 along a section which represents a bending line or first edge 5. As a result, the need for a welding process for attachment of spacing strips 3 to the lamination 10 is eliminated. The cut lines 4 are provided in the metal sheet in such a manner that the spacing strips 3 can easily be bent out of the main plane of the lamination 10. This bending step can be carried out by the machine that also carries out the stamping or laser-burning in order to produce the outlines 4 for the spacing strips 3.

Figure 3:
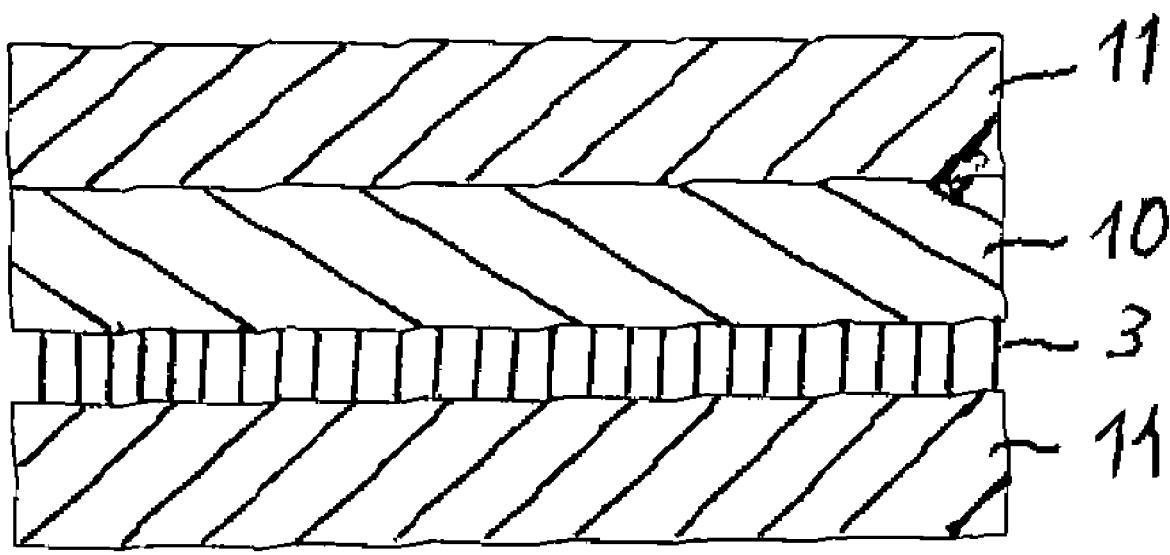
FIG. 3 is a fragmentary sectional view of a stack of laminations according to the present invention.

If a further lamination without spacing strips, as shown by way of example in FIG. 3 and designated by reference numeral 11, is arranged alongside the lamination 10 with the spacing strips 3, a portion of each spacing strip 3 touches the adjacent lamination 11 along a line, referred to hereinafter as contact line or second edge 6.

Figure 2:
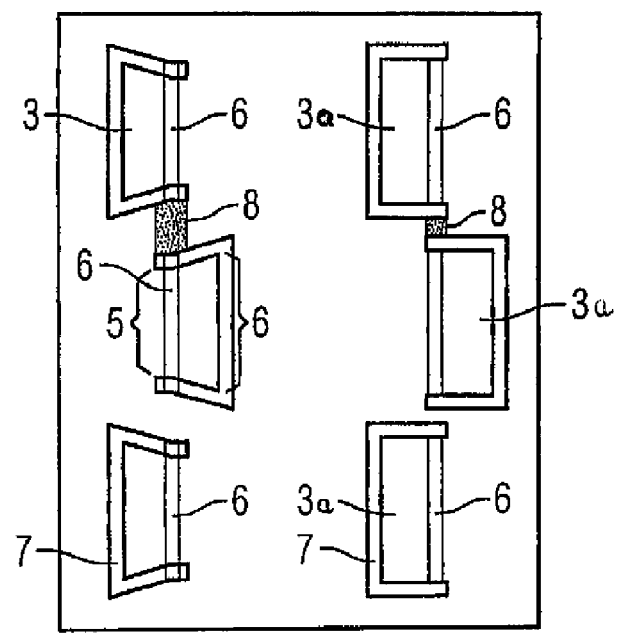
FIG. 2 is a schematic illustration of a lamination according to the present invention, depicting different forms of spacing strips.

Different contours for the spacing strips 3 can be defined depending on the choice for the cut lines 4. For example, the cut lines 4 can be applied to a lamination 10 such that spacing strips have a rectangular shape, as can be seen with reference to the three spacing strips 3a on the right-hand side of FIG. 2. However, currently preferred is the provision of the lamination 10 with free stamped areas 1 to form spacing strips 3 of v-shaped configuration, as shown by way of the three spacing strips 3 on the left-hand side of FIG. 2. In this case, the spacing strips 3 have contact lines 6 which are longer than the associated bending lines 5. For ease of illustration and better understanding, the spacing strips 3 have not only been projected onto the main plane of the lamination 10 but have also been bent out of the main plane, as indicated schematically in FIG. 2. Since the spacing strips 3 which have been bent out have been bent through an angle of approximately 90°, only that region of a spacing strip 3 which is referred to as the contact line 6 can be seen in FIG. 2.

A comparison of the contours of the spacing strips 3 with a remaining material 8 underscores the benefit of a v-shaped contour over a rectangular contour. Spacing strips 3 of v-shaped contour have therebetween a greater amount of remaining material 8 for the same length of contact line 6 than spacing strips 3a with a rectangular contour. Since the remaining material 8 provides stability for the lamination 10 together with the spacing strips 3, a v-shaped contour is preferable over a rectangular contour.

In addition, a v-shaped contour for the spacing strips 3 also ensures that, if a sufficiently large amount of material 8 remains, an adequate length can also be achieved for the contact line 6. This is necessary since the contact lines 6 of the individual spacing strips 3 of a lamination 10 are added together to form a contact surface via which an adjacent lamination 11 is held at a distance. This is ensured despite the pressure exerted on the lamination 11 by the provision of a large-area contact surface to cover the surface of the lamination 11.

Referring again to FIG. 2, it can be seen that the free stamped areas 7 for the contours of the spacing strips 3 have been applied such that the contact line 6 of one spacing strip 3 is located in a different direction to the associated bending line 5 than the contact line 6 and the bending line 5 of the neighboring spacing strip 3. For a viewer, the spacing strips 3 therefore project partially in a left-hand rotation and partially in a right-hand rotation out of the main plane of the lamination 10.

This alternate bending or angling of the spacing strips 3 also leads to the spacing strips 3 being able to better withstand the pressure which is exerted on them in comparison with spacing strips 3 which are bent on one side. Since the bending angle of the spacing angle which is bent out of the main plane of the lamination 10 is in general somewhat less than 90°, the spacing strips 3 if bent out on one side will be able to be bent back more easily by the pressure acting on them than is the case when they are bent out alternately. Furthermore, this disposition of the spacing strips 3 causes also turbulence when air flows between the lamination 10 with the spacing strips 3 and an adjacent lamination 11. The turbulence within the air path ensures improved cooling for the individual laminations.

Figure 4:
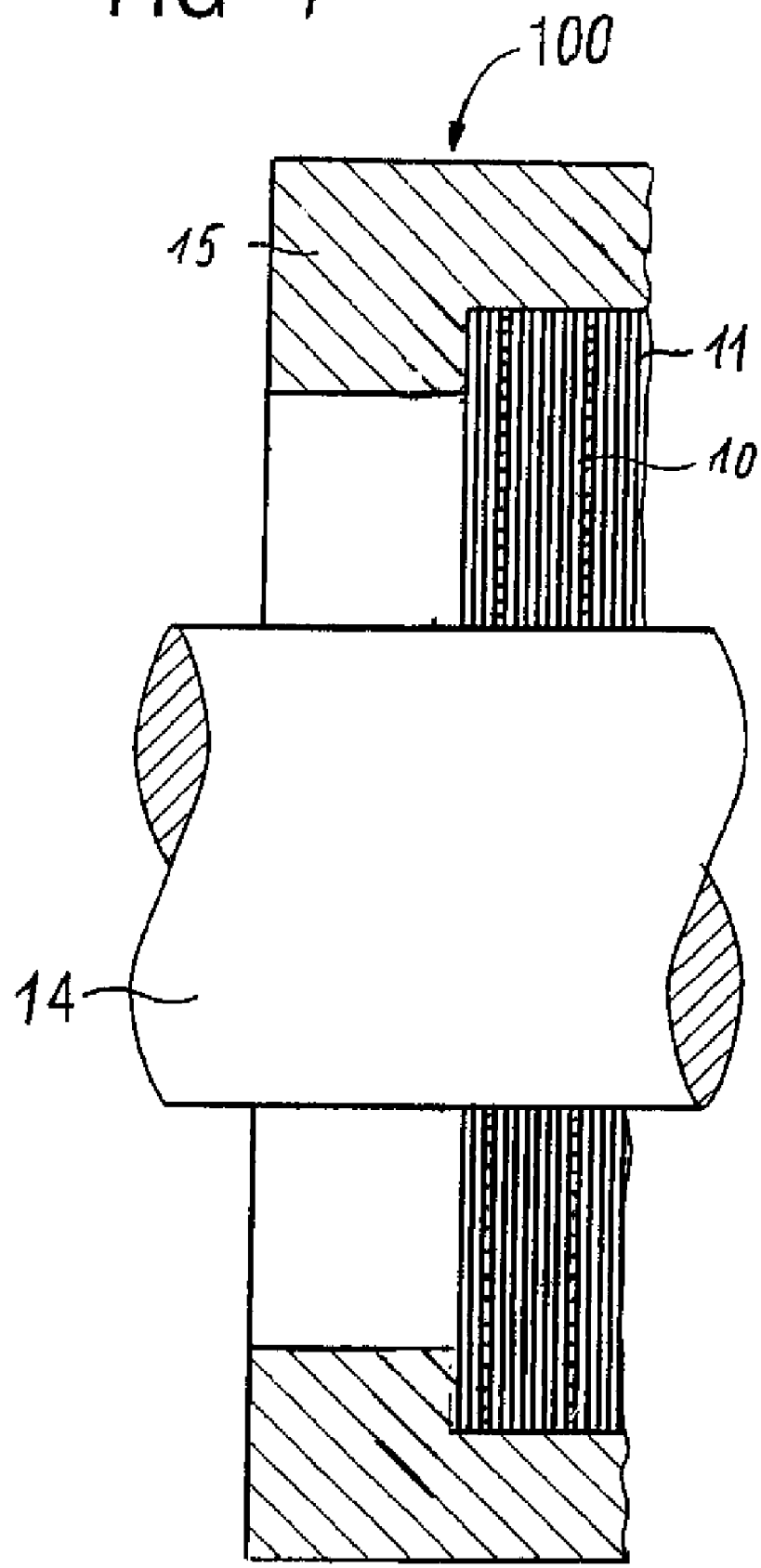
FIG. 4 is a partly sectional view of an example of a rotor core for an electric machine, embodying the present invention.

As described above, the incorporation of laminations 10 is shown by way of example in FIG. 4 which illustrates a partly sectional view of an example of a rotor core, generally designated by reference numeral 100 for an electric machine. The rotor core 100 can be shrink-mounted onto a shaft 14 and is formed of a plurality of stacked laminations 10, 11 which are received in end rings 15 and placed in a formation that is chosen by way of example only. It will be appreciated by persons skilled in the art that the electric machine must contain much mechanical apparatus which does not appear in the foregoing Figures. However, this apparatus, like much other necessary apparatus, is not part of the invention, and has been omitted from the Figures for the sake of simplicity.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A lamination, comprising a metal sheet defining a main plane and having at least two sets of plural single-piece spacing strips which have a non-circular cross section in axial and radial directions and project out from the main plane and which have a first edge formed in one piece with the metal sheet and a second free edge in opposition to the first edge intended for touching an adjacent metal sheet of another lamination to thereby define a passageway between the laminations for flow of air to cool the laminations, wherein a first one of the sets of spacing strips is arranged radially inwards on the metal sheet and a second one of the sets of spacing strips is arranged on the metal sheet radially outwards of the first set of spacing strips at a ratio of 1:2 of spacing strips, wherein the spacing strips of the first set of spacing strips are arranged in relation to the spacing strips of the second set of spacing strips such that the first edges of neighboring spacing strips of the first and second spacing strips extend on a common bending line.

2. The lamination of in claim 1, wherein the first and second edges extend in parallel relationship, thereby defining a trapezoidal configuration.

3. The lamination of in claim 1, wherein the second edge has a length which is longer than a length of the first edge.

4. An electric machine, comprising:
a stator; and
a rotor spaced from the stator to define an air gap therebetween and mounted on a shaft,
wherein the stator and the rotor have each a lamination core made of stacked laminations, wherein at least one of the laminations is a metal sheet defining a main plane and having at least two sets of plural single-piece spacing strips which have a non-circular cross section in axial and radial directions and project out from the main plane and which have a first edge formed in one piece with the metal sheet and a second free edge in opposition to the first edge intended for touching an adjacent one of the laminations to thereby define a passageway between the laminations for flow of air flow to cool the laminations, wherein a first one of the sets of spacing strips is arranged radially inwards adjacent to the shaft and a second one of the sets of spacing strips is arranged on the metal sheet radially outwards of the first set of spacing strips at a ratio of 1:2 of spacing strips, wherein the spacing strips of the first set of spacing strips are arranged in relation to the spacing strips of the second set of spacing strips such that the first edges of neighboring spacing strips of the first and second spacing strips extend on a common bending line.

5. The electric machine of claim 4, wherein the first and second edges extend in parallel relationship, thereby defining a trapezoidal configuration.

6. The electric machine of claim 4, wherein the second edge has a length which is longer than a length of the first edge.

7. The lamination of in claim 1, wherein each spacing strip of the sets of spacing strips has a flat v-shaped configuration.

8. The lamination of in claim 4, wherein each spacing strip of the sets of spacing strips has a flat v-shaped configuration.

9. The lamination of in claim 1, wherein the spacing strips of the first and second sets of spacing strips are arranged such that a spacing strip of the first set of spacing strips is placed between two neighboring spacing strips of the second set of spacing strips.

10. The lamination of in claim 4, wherein the spacing strips of the first and second sets of spacing strips are arranged such that a spacing strip of the first set of spacing strips is placed between two neighboring spacing strips of the second set of spacing strips.

* * * * *